United States Patent Office 2,782,141
Patented Feb. 19, 1957

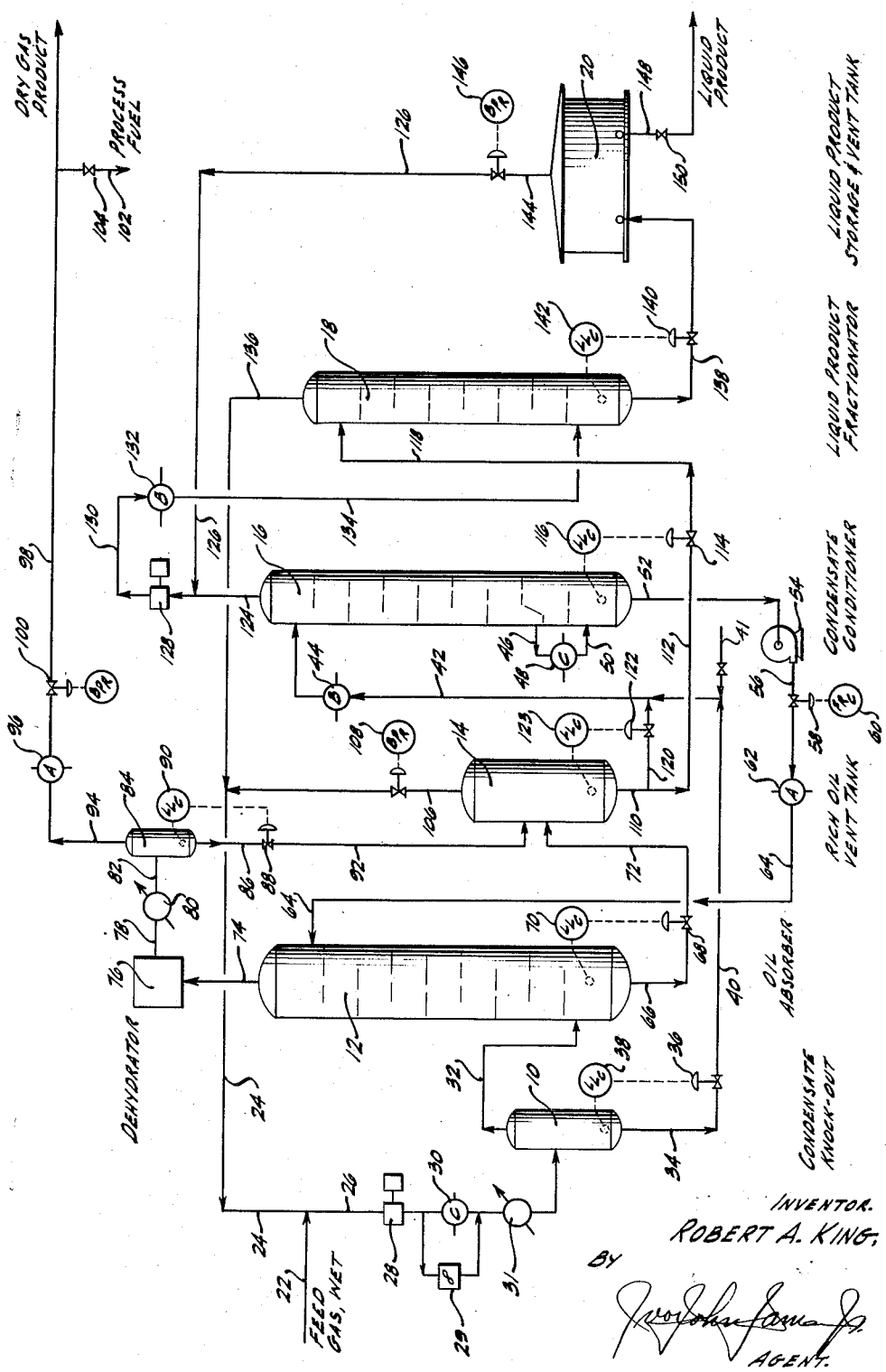

2,782,141
ABSORPTION PROCESS

Robert A. King, San Gabriel, Calif., assignor to Union Oil Company of California, Los Angeles, Calif., a corporation of California Application February 9, 1953, Serial No. 335,714

12 Claims. (Cl. 196—8)

This invention relates to the separation of gaseous mixtures by the partial absorption thereof in liquid absorbents or solvents and especially to an automatic process and apparatus which is especially adapted to the recovery of natural gasoline and liquefiable hydrocarbon constituents such as propane and butane and to produce a lean dry gas product from wet natural gas. The process is characterized by the facts that no separate or foreign absorption oil stream is used, the use of fuel-fired heaters, water-cooled heat exchangers, evaporative water coolers are eliminated, and the process and apparatus will operate continuously without supervision as is required in remote areas.

In the conventional treatment of natural gas for the separation of natural gasoline by absorption, an absorption oil stream is circulated successively through an absorption zone in contact with the wet natural gas feed and then through a stripping zone wherein it is heated and steam stripped to produce a stripped product and lean absorption oil, which oil is cooled and recirculated to the absorption zone. Conventionally, the absorption oil is a moderately high boiling hydrocarbon liquid having a molecular weight range of between about 150 and about 300 and a normal boiling range of between about 350° F. and about 500° F. Depending upon the pressure at which the absorption step is effected and the quantity of hydrocarbon materials to be absorbed, absorption oil is passed through the absorption zone at rates ranging from about 10 to about 100 gallons per MCF (thousand cubic feet) of feed gas. This quantity is relatively high and invariably causes lean gas product contamination therewith. After a certain period of use it becomes contaminated through deterioration and must be reconditioned by treatment in a separate distillation operation.

In the conventional process, steam generation facilities are required to provide for steam stripping the rich oil and for steam heating some of the process streams. Fuel-fired heaters are required, in addition to those for steam generation, for heating the rich oil passing into the stripping zone and often for fractionating the liquid product from the process. Water cooling is employed for cooling the compressed feed gas, cooling the lean oil flowing into the absorption, and for cooling and condensing the liquid product in the fractionation thereof. Such water-cooling steps require water circulation and the provision of evaporative water coolers. Continuous supervision of such an absorption plant is necessary.

The present invention is directed to an improved process which effectively separates wet natural gas into a dry gas product containing methane and ethane and a liquefied product containing as high as 90% of the propane together with the $C_4$ and higher molecular weight constituents without the use of a separate or foreign absorption oil stream or fuel-fired heaters or steam generation facilities or water-cooled exchangers or evaporative water coolers such as are required in the conventional absorption plant. In addition, the process of this invention is amenable to continuous unsupervised operation in remote oil- and gas-producing areas.

It is therefore a primary object of this invention to provide a process for the absorptive separation of gaseous mixtures in which substantially all of the water coolers and fuel-fired heaters have been successfully eliminated whereby a 90% saving in usual fuel requirements is obtained.

It is a more specific object of this invention to provide an improved process for the automatic unsupervised processing of wet natural gas in which no fuel-fired heaters or steam generation facilities or water coolers are employed.

It is also an object of this invention to provide an efficient absorption process in which the absorbent comprises a liquid fraction of constituents separated from the feed gas whereby solvent contamination of the dry gas product and absorbent deterioration are eliminated.

Other objects and advantages of the process of this invention will become apparent to those skilled in the art as the description thereof proceeds.

Briefly, the present invention comprises an absorption process for the fractionation of gaseous mixtures containing liquefiable or normally liquid constituents, which process is particularly adapted to the recovery of natural gasoline and propane and butane from wet natural gas streams. The wet natural gas, herein employed as representative of gaseous mixtures containing liquefiable constituents, is first compressed to a relatively high pressure, part is cooled in an aerial cooler, and the remaining part is cooled by indirect heat exchange with a process stream to effect the cooling and partial condensation of the compressed feed gas. The combined cooled stream is then refrigerated effecting further condensation. The condensate is then separated from the high pressure gas feed and the latter stream is introduced directly into the bottom of the absorption zone. The separated condensate is flashed and indirectly heated with a second process stream to form a warm partially vaporized condensate stream which is passed through a condensate conditioning zone under a relatively low pressure, such as subatmospheric pressure, to separate the light ends from the condensate and form a lean oil stream. The lean oil stream is then cooled by indirect heat exchange with a third process stream and introduced into the absorption zone wherein it countercurrently contacts the high pressure gas feed referred to above to form a rich oil and a lean oil-saturated lean gas. The lean gas stream is dehydrated by countercurrent contact with a liquid dehydrating agent, such as ethylene glycol, to produce a lean gas of substantially reduced moisture content. The dehydrated lean gas is then refrigerated in a Freon refrigeration system to subatmospheric temperatures to effect cooling and partial condensation. Substantially all of the lean oil contained in the lean gas is hereby recovered as a condensate and a dry gas product is produced comprising essentially methane and ethane and containing variable amounts of propane depending upon the lean oil-feed gas ratio. This refrigerated dry gas is warmed by indirect heat exchange with the lean oil produced from the condensate conditioning zone forming a cool lean oil (referred to above) and a warmed dry gas product which is produced from the process.

The lean oil condensate obtained by refrigeration is combined with the rich oil produced from the absorption zone and is flashed to a relatively low pressure to produce a flashed rich oil stream and a first vapor recycle containing considerable quantities of dry gas constituents. The flashed rich oil is passed downwardly through an adiabatic liquid product fractionation zone wherein it is countercurrently contacted with the compressed flashed vapors produced in the condensate conditioning zone forming a second vapor recycle and a liquid product. The first and second vapor recycles are combined with the wet natural gas feed. The liquid product is passed into a product storage and venting zone. Evolved product vapors from the product storage and venting zone are recirculated into the adiabatic product fractionation zone and a liquid product comprising C$_4$ and higher molecular weight hydrocarbons together with a variable proportion of propane is removed as a liquid product of the process from the storage and venting zone.

A small proportion of the dry gas product is employed as fuel for gas engine driven gas and refrigerant compressors which supply the entire energy requirement of the process. No water-cooled exchangers, fuel-fired heaters, or evaporative water coolers are involved and as will be subsequently indicated the process and apparatus is made entirely automatic whereby no supervision is needed.

The present invention will be more clearly understood by reference to the accompanying drawing which consists of a schematic flow diagram of the process of this invention. The process indicated in the drawing will be described in detail including operating pressure, temperatures, flow rates, and fluid compositions by way of specific example of the present invention.

Although the following description is drawn to the fractionation of wet natural gas in which methane and ethane are separated from propane and higher molecular weight hydrocarbons, this is not to be understood as a limitation of the present invention since the fractionation of methane from C$_2$ and higher molecular weight hydrocarbons or the separation of C$_1$ and C$_2$ and C$_3$ hydrocarbons from the C$_4$ and higher molecular weight hydrocarbons may also be effected according to the process of this invention by relatively slight changes in operating pressures and lean oil-feed gas ratios. The purpose of the present invention is further not to be understood as restricted to the treatment of paraffin hydrocarbon constituents alone for it is applicable as described to the treatment of hydrocarbon gas mixtures containing hydrogen as well as the olefines and acetylenes and the like.

Referring now more particularly to the drawing, the principal vessels involved in the process of this invention include condensate separation zone 10, absorption zone 12, rich oil vent zone 14, condensate conditioning zone 16, adiabatic liquid product fractionation zone 18, and liquid product storage and vent zone 20. The feed gas to the process, comprising wet natural gas produced from a southern California oil field in Kern County, California, is introduced at a rate of 3,000 MCF/D (thousand cubic feet per day) through line 22. The feed gas has the following composition:

TABLE I

*Feed gas composition*

| Component: | Mol percent |
| --- | --- |
| H$_2$O, CO$_2$, air | 0.90 |
| Methane | 66.07 |
| Ethane | 14.26 |
| Propane | 11.73 |
| Butanes | 4.32 |
| Pentanes and heavier | 1.72 |
| | 99.00 |

This wet natural gas feed is mixed with a combined vapor recycle stream flowing at a rate of 150 MCF/D through line 24 and the mixture then flows through line 26 into feed gas compressor 28 in which the pressure is raised to about 450 p. s. i. g. (pounds per square inch gauge). This hot compressed gas stream is then split and passed in part through aerial cooler 29. The remaining part passes through interchanger 30 wherein it is exchanged with a side stream of condensate removed from adjacent the bottom of the condensate conditioning zone 16 whereby the condensate is heated and the compressed natural gas is cooled and partially condensed, as stated above, at a temperature of about 90° F. The combined compressed gas is then refrigerated to about 60° F. in refrigerator 31 to effect further condensation. The refrigerated compressed mixture is then introduced into condensate separation zone 10. The compressed feed gas passes therefrom through line 32 into the bottom of absorption zone 12 which will be subsequently considered.

The condensate formed by the cooling and compression flows from condensate separation zone 10 through line 34 at a rate of about 200 gallons per day controlled by a valve 36 in accordance with liquid level controller 38. The condensate flashes from 450 p. s. i. g. to about −5 p. s. i. g. (10 inches of mercury vacuum), is mixed with condensate flowing through line 41 and obtained from the intermediate pressure stage of compressor 28 and flows through lines 40 and 42, is heated and partially vaporized in interchanger 44, and is then passed into the upper portion of condensate conditioning zone 16.

The liquid phase of flashed condensate passes downwardly through condensate conditioning zone 16 countercurrent to rising vapors evolved in the lower portion thereof. A side stream is removed therefrom through line 46 and is heated by indirect heat exchange in interchanger 48 with the compressed feed gas and partially vaporized. The vapor and condensate are returned through line 50 thereby heating the bottom portion of the column to permit fractionation of the flashed condensate. A warm lean oil, consisting of the higher molecular weight constituents of the feed gas, is removed from the bottom of condensate conditioning zone 16 through line 52. The composition of the lean oil is approximately as follows:

TABLE II

*Lean oil composition*

| Component: | Mol percent |
| --- | --- |
| Propane | 0.10 |
| Iso-butane | 0.15 |
| N-butane | 0.30 |
| Iso-pentane | 0.40 |
| N-pentane | 0.60 |
| Hexanes and heavier | 98.45 |
| | 100.00 |

The lean oil is pumped by means of lean oil pump 54 through line 56 at a rate of about 15,000 gallons per day controlled by valve 58 and flow recorder controller 60. The lean oil passes through interchanger 62 wherein it is cooled and refrigerated to a temperature of about 60° F. by indirect heat exchange as subsequently described. The refrigerated lean oil then passes through line 64 into the top of absorption zone 12 for passage downwardly therethrough.

Within absorption zone 12 the compressed feed gas and the refrigerated lean oil are countercurrently contacted to produce a rich oil containing dissolved constituents of the feed gas and a lean oil-saturated lean gas consisting essentially of methane and ethane, but containing a certain quantity of C$_5$ and higher molecular weight constituents from the lean oil. The rich oil is removed from the bottom of absorption zone 12 through line 66 at a rate of about 18,000 gallons per day controlled by valve 68 in accordance with liquid level controller 70. This rich oil is flashed from a pressure of about 450 p. s. i. g. to a pressure of about 60 p. s. i. g. and is introduced through line 72 into rich oil vent zone 14 subsequently described.

The lean gas referred to above is removed from the top of absorption zone 12 through line 74 and is passed through dehydration zone 76 wherein the water vapor content thereof is substantially reduced. Preferably this dehydration is effected by countercurrently contacting the lean gas with a stream of liquid dehydrating agent such as ethylene glycol or the like. The moist dehydrating agent is regenerated in the conventional manner.

The dehydrated lean gas passes from dehydration zone 76 through line 78 into refrigeration zone 80 wherein the temperature is lowered to about 30° F. thereby effecting a substantially complete partial condensation of the lean oil vapors contained in the dehydrated lean gas. The refrigerated lean gas passes through line 82 into lean gas condensate separation zone 84 wherein the refrigerated lean gas and the lean oil condensate are separated. The condensate flows through line 86 at a rate of about 900 gallons per day controlled by valve 88 and liquid level controller 90. The lean oil condensate is flashed from about 450 p. s. i. g. to a pressure of about 60 p. s. i. g. thereby effecting a partial vaporization. The thus flashed mixture flows through line 92 into rich oil vent zone 14 into which the flashed rich oil is simultaneously introduced through line 72.

The refrigerated dry gas is removed from separation zone 84 through line 94 and passes through interchanger 96 in indirect heat exchange relation with the lean oil passing through interchanger 62. Interchangers 96 and 62 are designated by means of the letter A. As stated before, the lean oil is hereby refrigerated and the refrigerated dry gas is warmed and passes through line 98 at a rate of about 2745 MCF/D controlled by back pressure regulator 100. The composition of the dry gas product is as follows:

TABLE III

Dry gas product composition

| Component: | Mol percent |
|---|---|
| $H_2O$, $CO_2$, air | 1.0 |
| Methane | 74.32 |
| Ethane | 16.00 |
| Propane | 8.07 |
| Butanes and heavier | 0.61 |
| | 100.00 |

A portion of this dry gas product is separated through line 102 at a rate of about 300 MCF/D controlled by valve 104 for use as fuel in the engine driven compressors employed for compressing the feed gas, for refrigerating the dehydrated lean gas, and for maintaining the subatmospheric pressure in condensate conditioning zone 16.

Returning now to rich oil vent zone 14, the lean oil condensate flowing through line 92 and the rich oil flowing through line 72 are both introduced into vent zone 14. A first vapor recycle, consisting primarily of methane, ethane and some propane and butane, is removed from vent zone 14 through line 106 at a rate of 100 MCF/D controlled by back pressure regulator 108 and recycled through line 24 for combination with the wet feed gas. The flashed rich oil is removed from the bottom of zone 14 through line 110 and is divided into two portions. The minor portion is passed through line 112 at a rate of about 1000 gallons per day controlled by valve 114 in accordance with liquid level controller 116 and flows through line 118 into the upper portion of adiabatic liquid product fractionation zone 18 to be subsequently described. The principal portion, the amount of which is inversely proportional to the amount of condensate produced by the wet feed gas compression, is passed through line 120 at a rate controlled by valve 122 and liquid level controller 123 to supplement, if necessary, the flashed condensate flowing through lines 40 and 42 into the upper portion of condensate conditioning zone 16. For a given separation and a given wet feed gas composition, a certain required quantity of lean oil is necessary. The quantity of flashed rich oil thus bypassed through line 120 into the condensate stream described is controlled by valve 122 and controller 123 at a rate sufficient to produce the required quantity of lean oil from the bottom of condensate conditioning zone 16. In the present example, the condensate obtained on feed gas compression amounted to only about 3–4% of the amount of lean oil required and therefore the flashed rich oil flowing through line 120 was controlled at a rate of 17,000 gallons per day to make up the deficiency.

In many cases, the condensate is more than sufficient to provide the lean oil required and line 120 is not used.

Within condensate conditioning zone 16 the heated and partially vaporized mixture of condensate and bypassed make-up flashed rich oil flows downwardly therethrough countercurrent to the rising stream of vapors evolved due to the heat of compression introduced near the bottom by exchanging the side stream referred to with the compressed wet feed gas. This heat exchange is effected in the interchanger designated as C and referred to separately as exchangers 30 and 48 in the description above.

The flashed vapor stream produced in converting the flashed condensate to lean oil is removed through line 124, is combined with a product vapor recycle flowing through line 126 which will be described subsequently and is compressed in flashed vapor compressor 128. The suction pressure of this compressor maintains condensate conditioning zone 16 at a pressure of about —5 p. s. i. g. and discharges compressed flashed vapors through line 130 at a pressure of about 40 p. s. i. g. and a temperature of about 200° F. The compressed flashed vapors are cooled and partially condensed by passage through interchanger 132 in indirect heat exchange with the flashed condensate flowing through interchanger 44. Interchangers 44 and 132, being the same device, are commonly designated as B. The cooled and partially condensed flashed vapors subsequently pass through line 134 and are introduced into the bottom of adiabatic liquid product fractionation zone 18.

The principal portion of the flashed rich oil introduced through line 118 flows downwardly through fractionation zone 18 countercurrent to the cooled flashed vapors introduced through line 134. An active fractionation occurs whereby the flashed rich oil is completely stripped of lean gas hydrocarbons, namely methane and ethane, and substantially all of the butane and heavier hydrocarbons are absorbed from the cooled flashed vapor. In this operation a second vapor recycle containing lean gas constituents and some heavier hydrocarbons is removed from the top of fractionation zone 18 through line 136 at a rate of about 50 MCF/D and is combined with the first vapor recycle referred to above and is recirculated for combination and retreatment with the wet feed gas.

A liquid product substantially free of methane and ethane is removed from the bottom of fractionation zone 18 through line 138 at a rate of about 6990 gallons per day controlled by valve 140 in accordance with liquid level controller 142. This liquid product is passed into liquid product storage and vent zone 20 maintained at a pressure of about 30 p. s. i. g. A product vapor recycle, evolved from the liquid product depressuring into storage and vent zone 20, is passed through line 144 at a rate of about 20 MCF/D controlled by back pressure regulator 146. This product recycle consists essentially of traces of methane and ethane and substantial quantities of propane. It is therefore passed through line 126, is combined with the flashed vapors evolved from condensate conditioning zone 16 and compressed and cooled and retreated therewith in adiabatic liquid product fractionation zone 18.

A substantially methane- and ethane-free liquid product is removed from product storage and vent zone 20 through line 148 at a rate of about 6490 gallons per day controlled by valve 150. This liquid product has the following composition:

TABLE IV

Liquid product composition

| Component: | Liquid percent |
|---|---|
| Methane | 0.06 |
| Ethane | 1.88 |
| Propane | 25.03 |
| Butanes | 36.40 |
| Pentanes and heavier | 36.63 |
| | 100.00 |

In the foregoing operation, 95% of the pentanes and heavier hydrocarbons are recovered from the wet feed gas. The butane extraction is 95% and the propane extraction is 30%. The dry gas product is contaminated with only 8.7% of C₃ and heavier hydrocarbons.

The lean oil to feed gas ratio in the absorption zone was 5 gallons per MCF of feed. This is about 40% of the ratio required when a separate absorption oil is employed. To increase the propane extraction to 90%, the oil to feed gas ratio can be increased to about 15 gallons. To produce a methane dry gas and recover substantial quantities of ethane, appropriate increases in pressure in zones 14, 18, and 20 must be employed. In case the propane is desired in the dry gas product along with methane and ethane, decreases in pressure of zones 14, 18, and 20 may be used.

In the process of this invention, the absorption zone 12 may be operated between pressure limits of between about 50 and 2500 p. s. i. g. with appropriate changes in lean oil to feed gas ratio. Preferably the pressure is maintained at values between about 150 and 750 p. s. i. g. Rich oil vent zone 14 may be operated at pressures between about 25 and 250 p. s. i. g., preferably pressures lying between about 50 and 100 p. s. i. g. The condensate conditioning zone is preferably operated in the lowest feasible pressure, preferably subatmospheric, and pressures of the order of −1 to −14 p. s. i. g. are desirable. This pressure is quite critical since at higher pressures residual lower molecular weight hydrocarbons are retained in the lean oil. The adiabatic liquid product fractionator may be operated at pressures between about 0 p. s. i. g. and about 100 p. s. i. g. with pressures in the range of about 10 to about 75 p. s. i. g. being preferred. The liquid product storage and vent zone 20 may be operated at pressures of the order of 0 p. s. i. g. to about 70 p. s. i. g.

The relationship between the pressures of the principal contacting zones described above is highly important to secure the fractionation described. Absorption zone 12 is operated at the highest pressure in the entire system and condensate conditioning zone is maintained at the lowest pressure in the system. The adiabatic liquid product fractionation zone is operated at a pressure substantially less than the absorption zone and substantially greater than the conditioning zone. The rich oil vent zone 14 is preferably operated slightly above that in the liquid product fractionation zone and substantially less than the pressure of the absorption zone. The liquid product storage and vent zone is preferably maintained at a pressure somewhat less than that of the liquid product fractionation zone. For the separation of about 30% of the propane and substantially all of the heavier hydrocarbons from methane and ethane in a wet natural gas, an absorption zone pressure of 450 p. s. i. g., rich oil vent zone pressure of 60 p. s. i. g., liquid product fractionation zone pressure of 40 p. s. i. g., liquid product storage and vent zone pressure of about 30 p. s. i. g. and a condensate conditioning zone pressure of −5 p. s. i. g. have been found highly satisfactory.

With reference to the foregoing description, it is pointed out that the fractionation under specific relative pressure conditions indicated is effected in the complete absence of fuel-fired heaters and heat exchange equipment involving cooling water, which latter consideration eliminates the use of evaporative water coolers normally required.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the separation of wet hydrocarbon gas mixtures containing normally liquid and liquefiable constituents which comprises compressing a wet hydrocarbon feed gas to a relatively high pressure, cooling the compressed feed gas to effect condensation of the higher boiling hydrocarbons, separating this feed gas condensate from the compressed feed gas, flashing said feed gas condensate into a condensate conditioning zone at a pressure maintained between about −1 p. s. i. g. and about −14 p. s. i. g. to produce a lean condensate and flashed vapors, countercurrently contacting said lean condensate and said compressed feed gas in an absorption zone at a pressure between about 50 p. s. i. g. and about 2500 p. s. i. g. to form a rich condensate and a lean gas saturated with vapors of said lean condensate, refrigerating said lean gas to a subatmospheric temperature without substantial change in pressure forming a recovered lean condensate fraction and a lean condensate-free dry gas product, simultaneously flashing said rich condensate and said recovered lean condensate fraction into a vent zone at a pressure maintained between about 25 p. s. i. g. and about 250 p. s. i. g. to form a flashed rich condensate and a first vapor recycle, compressing said flash vapor countercurrently contacting the compressed flashed vapor with said flashed rich condensate in a liquid product fractionation zone at a pressure between about 0 p. s. i. g. and about 100 p. s. i. g. to produce a liquid hydrocarbon product and a second vapor recycle, combining said first and second vapor recycle streams with said wet hydrocarbon feed gas, passing said liquid product into a product storage zone at a pressure maintained between about 0 p. s. i. g. and about 70 p. s. i. g., combining evolved vapor from said storage zone with said flashed vapor, and removing a liquid hydrocarbon product from said storage zone.

2. A process according to claim 1 in combination with the steps of heat exchanging said lean condensate with said refrigerated dry gas, heat exchanging said compressed flashed vapors with said feed gas condensate, and heat exchanging said compressed feed gas with a side stream of lean condensate removed from and then reintroduced to said condensate conditioning zone whereby the entire heat energy required for separating said dry gas product from said liquid hydrocarbon product is supplied by gas compression.

3. A process according to claim 1 wherein said wet hydrocarbon feed gas comprises natural gas containing natural gasoline vapors.

4. A process according to claim 1 wherein said wet hydrocarbon feed gas comprises a cracked hydrocarbon gas containing cracked gasoline vapors.

5. A process for the separation of wet natural gas without the use of water cooling, steam heating or stripping or fuel-fired heating which comprises compressing wet natural gas to a pressure of about 450 p. s. i. g., cooling the compressed natural gas to effect a condensation of the higher boiling constituents, separating the condensate from the compressed gas, flashing said condensate to a pressure of about −5 p. s. i. g. in a condensate conditioning zone to produce a lean condensate and flashed vapors, passing said lean condensate downwardly through an absorption zone countercurrent to said compressed gas to form a rich condensate and a lean condensate saturated lean gas, refrigerating said lean gas to separate a recovered lean condensate therefrom leaving a dry gas product, simultaneously flashing the thus recovered lean condensate and said rich condensate from about 450 p. s. i. g. into a vent zone at about 60 p. s. i. g. forming a flashed rich condensate and a first vapor recycle, passing at least part of said flashed rich condensate downwardly through an adiabatic product fractionation zone at a pressure of about 40 p. s. i. g., compressing said flashed vapor from about −5 p. s. i. g. to about 40 p. s. i. g., countercurrently contacting said flashed rich condensate with the compressed flashed vapors in said fractionation zone to produce a second vapor recycle and a liquid product, combining said first and second recycle vapors with said wet natural gas, passing said liquid product into a product vent zone at a pressure of about 30 p. s. i. g., combining vapors evolved therefrom with said flashed vapor, and removing a liquid product from said product vent zone.

6. A process according to claim 5 in combination with the step of contacting said lean gas flowing from said absorption zone with a countercurrent flow of a liquid dehydrating agent prior to the refrigeration of said lean gas.

7. A process according to claim 6 wherein said liquid dehydrating agent comprises ethylene glycol.

8. A process according to claim 5 in combination with the step of combining a sufficient amount of said flashed rich condensate with said condensate prior to the introduction of said condensate into said condensate conditioning zone to produce a sufficient volume of said lean condensate for passage through said absorption zone.

9. A process according to claim 5 in combination with the step of separating a portion of said dry gas product as fuel for compressing said wet natural gas and said flashed vapors and in refrigerating said lean gas and said compressed feed gas to supply the energy of separation required in the process.

10. A process according to claim 5 in combination with the step of passing said lean condensate flowing from said conditioning zone in indirect heat exchange relation with said dry gas product subsequent to refrigeration and separation of said recovered lean condensate fraction therefrom to form a warmed dry gas product and a cooled lean condensate.

11. A process according to claim 5 in combination with the step of passing said compressed flashed vapors into indirect heat exchange relation with the liquid stream containing said condensate entering said condensate conditioning zone to form a cool partially condensed compressed vapor and a warmed partially vaporized stream of said condensate.

12. A process according to claim 5 in combination with the step of separating a liquid side stream from the liquid flowing downwardly through said condensate conditioning zone, passing said side stream into indirect heat exchange relation with said compressed natural gas to form a cool partially condensed natural gas stream and a warmed partially vaporized side stream, and passing said side stream back into said conditioning zone to supply heat thereto.

References Cited in the file of this patent

UNITED STATES PATENTS

| | | |
|---|---|---|
| 2,214,678 | Raigorodsky | Sept. 10, 1940 |
| 2,262,202 | Ragatz et al. | Nov. 11, 1941 |
| 2,265,510 | Borden | Dec. 9, 1941 |
| 2,297,675 | Dayhuff et al. | Oct. 6, 1942 |
| 2,322,354 | Gerhold et al. | June 22, 1943 |
| 2,409,691 | Noble | Oct. 22, 1946 |
| 2,468,750 | Gudenrath | May 3, 1949 |
| 2,472,810 | Denig | June 14, 1949 |
| 2,528,028 | Barry | Oct. 31, 1950 |